Nov. 18, 1941.      G. HICKS      2,262,762
RETRACTABLE LANDING GEAR FOR AIRCRAFT
Filed Nov. 4, 1939      2 Sheets-Sheet 1
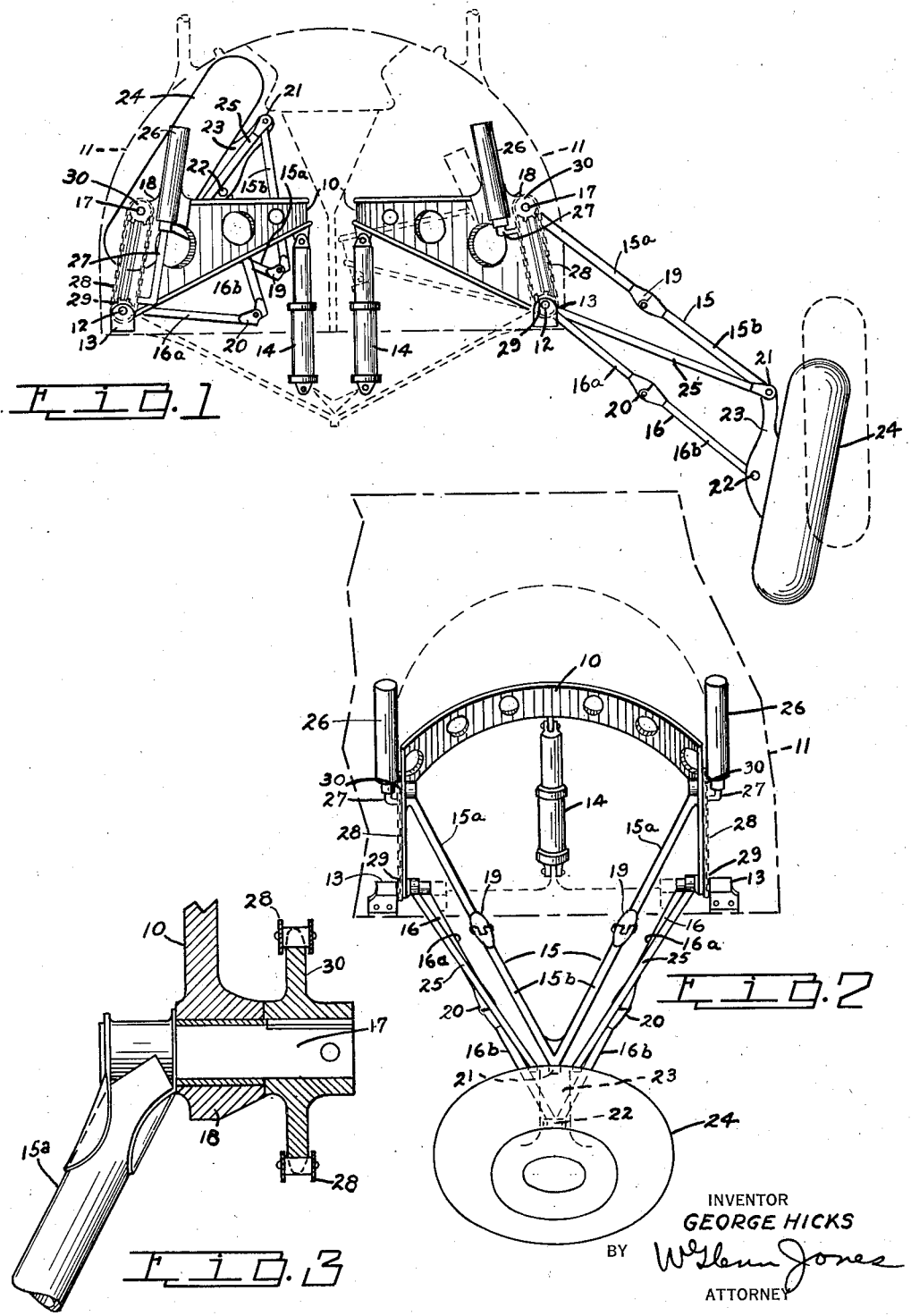
INVENTOR
GEORGE HICKS
BY W. Glenn Jones
ATTORNEY Nov. 18, 1941.   G. HICKS   2,262,762
RETRACTABLE LANDING GEAR FOR AIRCRAFT
Filed Nov. 4, 1939   2 Sheets-Sheet 2
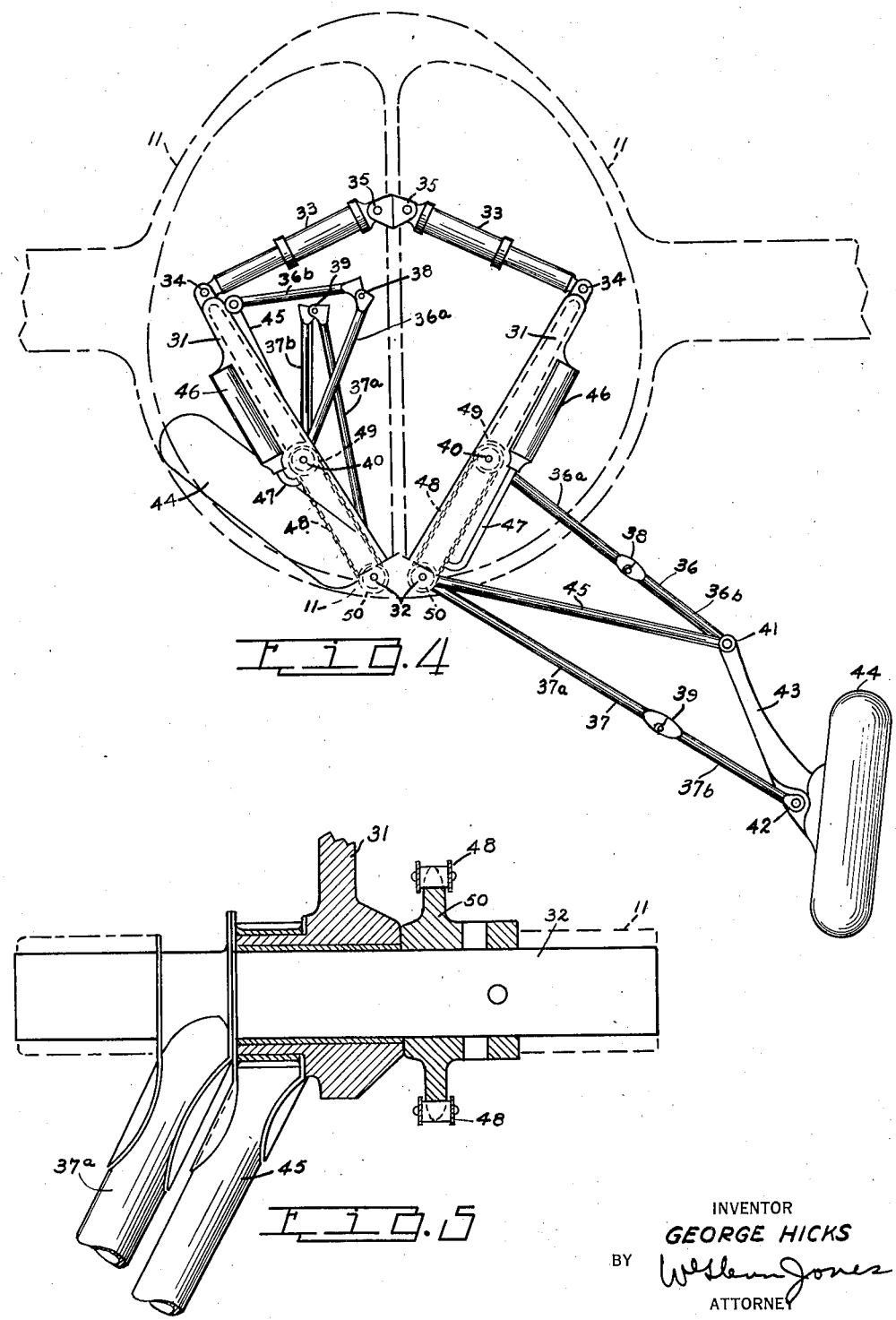
INVENTOR
GEORGE HICKS
BY
ATTORNEY Patented Nov. 18, 1941

2,262,762

UNITED STATES PATENT OFFICE 2,262,762

RETRACTABLE LANDING GEAR FOR AIRCRAFT

George Hicks, Philadelphia, Pa.

Application November 4, 1939, Serial No. 302,845

5 Claims. (Cl. 244—102)

(Granted under the act of March 3, 1883, as amended April 30, 1928; 370 O. G. 757)

The present invention relates to landing gear for aircraft and it has a particular relation to landing gear mounted for movement between housed and extended positions within and without the fuselage of the aircraft.

The principal object of the present invention is the provision of a landing gear of the character described, in which the relatively heavy portions thereof such as the oleo strut are permanently housed within the fuselage and in which the ground engaging elements and connecting strut members are completely housed within the fuselage when retracted without altering the streamline configuration of the fuselage, such as by providing swellings or enlargements therein for receiving the mechanism.

Another object of the invention is the provision of a retractable and extensible landing gear which is self-locking when in its extended position so as to relieve the operating instrumentalities from undue strain.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a front elevational view of the improved landing gear, one of the ground engaging elements being shown in its extended position and the other in its retracted position within the fuselage;

Fig. 2 is a side elevational view of the structure shown in Fig. 1, as viewed from the right-hand side of this figure;

Fig. 3 is an enlarged detail view partly in elevation and partly in section of the pivotal connection between the upper strut and the yoke portion of the mechanism;

Fig. 4 is a view similar to Fig. 1, but illustrating another form of the invention; and Fig. 5 is a view partly in elevation and partly in section of the pivotal connection between one of the lower struts and the yoke portion of the mechanism shown in Fig. 4.

Referring to the drawings, and particularly to Figs. 1, 2 and 3 thereof, a retractable landing gear embodying the invention is shown as comprising a pair of substantially U-shaped or semicircular yoke members 10, the outer ends of each of which are pivotally connected with the frame of the fuselage 11 of the aircraft for vertical swinging movement by pivot pins 12 mounted in bearings 13, (Fig. 2). Inasmuch as the landing gear on each side of the aircraft is identical in construction and operation, only one will be described. The central or bowed portion of the yoke 10 is supported by a shock absorbing device, such as an oleo strut 14, the lower end of which is pivotally connected with the frame 11 of the fuselage. Extending outwardly and downwardly from the yoke 10 is a pair of substantially V-shaped upper and lower struts 15 and 16 which are pivotally mounted on the yoke at spaced points, the lower strut 16 being fixed to the pivot pin 12 and the upper strut 15 being fixed to a pivot pin 17 journalled in a bearing 18 on the yoke. The struts 15 and 16 are hinged intermediate their ends by knee joints 19 and 20 respectively, thus dividing the upper strut into sections 15a and 15b, and the lower strut into sections 16a and 16b. The converging ends of the sections 15b and 16b of the struts 15 and 16 are pivotally connected at spaced points, as at 21 and 22 to a wheel mounting 23 provided with a stub axle on which is mounted a ground wheel 24. A V-shaped radius rod 25 connects the pivot pins 12 with the pivotal connection 21 and forms a brace to hold the struts extended when the wheel is supporting a load and prevents the struts 15 and 16 from hinging except when the landing gear is retracted.

This retracting movement is effected through the medium of a pair of fluid pressure devices, each comprising a cylinder 26 fixed to a leg of the yoke 10 adjacent to the outer end thereof. The cylinders 26 are each provided with a piston rod 27, the lower end of which is fixed to an endless sprocket chain 28 passing around sprocket wheels 29 and 30 keyed to the stub shafts 12 and 17 respectively. When fluid under pressure is admitted into the upper portion of the cylinders 26 the piston rods are forced downwardly, thereby causing the sprocket chains 28 to rotate the sprocket wheels 29 and 30 in a counterclockwise direction, as viewed in Fig. 1, and swing the inboard sections 15a and 16a of the struts 15 and 16 upwardly. This breaks the knee joints 19 and 20 and lifts the outboard sections 15b and 16b together with the ground wheel 24, the movement of the parts being guided and controlled by the V-shaped radius rods 25. This lifting movement continues until the entire landing gear is completely housed within a compartment provided in the fuselage, as shown at the lefthand side of Fig. 1.

In Figs. 4 and 5, there is shown another form of the invention wherein a pair of semi-circular yoke members 31 are pivotally mounted at their ends on stub shafts 32 journalled in the frame 11 of the fuselage adjacent to and on each side of the center line thereof and extend upwardly and outwardly therefrom. Inasmuch as the landing gear on each side of the aircraft is also identical in construction and operation, only one will be described. The central or bowed portion of each of the yoke members 31 is supported by a shock absorbing device, such as an oleo strut 33, one end of which is pivotally connected therewith by a pivot pin 34 and the other end of which is pivotally connected with the frame of the fuselage by a pivot pin 35.

As in the structure previously described, the landing gear on each side of the aircraft includes a pair of substantially U-shaped struts 36 and 37 arranged in spaced relation one above the other. The upper strut 36 is hinged intermediate its ends by a knee joint 38, thus dividing the strut into an inner section 36a and an outer section 36b. In a like manner the lower strut 37 is hinged intermediate its ends by a knee joint 39, thus dividing this strut into an inner section 37a and an outer section 37b. The inner ends of the section 36a of the upper strut 36 are fixed to stub shafts 40 journalled in the yoke 31 and the inner ends of the section 37a are fixed to the stub shafts 32. The converging ends of the outer ends of the sections 36b and 37b of the upper and lower struts 36 and 37 are pivotally connected at spaced points as at 41 and 42 with a bracket 43 on which a ground wheel 44 is mounted. A substantially U-shaped radius rod 45 is pivotally connected at its inner end with the stub shafts 32 and at its outer end with the pivotal connection 41, and forms a brace for holding the struts 36 and 37 extended when the landing gear is supporting a load.

The retracting mechanism for the landing gear just described includes a pair of fluid pressure devices, one fixed to each leg of the yoke member 31 and each comprising a fluid pressure cylinder 46 provided with a piston rod 47. The lower end of each of the piston rods 47 is fixed to an endless sprocket chain 48 which passes around vertically spaced sprocket wheels 49 and 50 keyed to the stub shafts 40 and 32 respectively.

The operation of the mechanism is substantially the same as that previously described in connection with the structure shown in Figs. 1, 2 and 3, except that the arrangement of the parts is such that the wheels 44 are swung upwardly and under the lifting instrumentalities, instead of upwardly and over the same. The compartments housing the retracted landing gear in both forms of the invention may be closed by a suitable door or by fairing or pants structure carried by the ground wheels so as to complete the streamline configuration of the fuselage, thus reducing air drag.

It will be understood that the above description and accompanying drawings comprehend only the general and preferred embodiment of the invention, and that various other changes in the construction, proportion and arrangement of the parts may be made by those skilled in the art without departing from the nature and scope of the invention as defined in the appended claims.

The invention described herein may be manufactured and/or used by or for the Government of the United States of America for governmental purposes without the payment of any royalties thereon or therefor.

I claim:

1. In combination with the fuselage of an aircraft, a landing gear therefor comprising a yoke pivoted at its ends on the frame of the fuselage for limited swinging movement, an oleo strut pivotally connected at one end to said yoke intermediate the ends thereof and at its other end with said frame, said yoke and oleo strut being at all times located within said fuselage, strut means pivotally connected at its inner end with said yoke and hinged intermediate its ends for folding movement in an upward direction, a ground engaging element pivotally connected with the outer end of said strut means, and means for swinging said strut means about its pivotal connection with said yoke to carry said ground engaging element between housed and extended positions within and without said fuselage, said yoke and strut means constituting a lever of the first class when the latter is extended for yieldably supporting said aircraft.

2. In combination with the fuselage of an aircraft, a landing gear therefor comprising a yoke pivoted at its ends on the frame of the fuselage for limited swinging movement, an oleo strut pivotally connected at one end to said yoke intermediate the ends thereof and at its other end with said frame, said yoke and oleo strut being at all times located within said fuselage, strut means pivotally connected at its inner end with said yoke and hinged intermediate its ends for folding movement in an upward direction, a ground engaging element pivotally connected with the outer end of said strut means, and hydraulic means for swinging said strut means about its pivotal connection with said yoke to carry said ground engaging element between housed and extended positions within and without said fuselage, said yoke and strut means constituting a lever of the first class when the latter is extended for yieldably supporting said aircraft.

3. In combination with the fuselage of an aircraft, a landing gear therefor comprising a yoke pivoted at its ends on the frame of the fuselage for limited swinging movement, an oleo strut pivotally connected at one end to said yoke intermediate the ends thereof and at its other end with said frame, said yoke and oleo strut being at all times located within said fuselage, strut means pivotally connected at its inner end with said yoke and hinged intermediate its ends for folding movement in an upward direction, a ground engaging element pivotally connected with the outer end of said strut means, chain and sprocket means for swinging said strut means about its pivotal connection with said yoke to carry said ground engaging element between housed and extended positions within and without said fuselage, said yoke and strut means constituting a lever of the first class when the latter is extended for yieldably supporting said aircraft, and hydraulic means for actuating said chain and sprocket means.

4. In combination with the fuselage of an aircraft, a landing gear therefor comprising a yoke pivoted at its ends on the frame of the fuselage for limited swinging movement, an oleo strut pivotally connected at one end to said yoke intermediate the ends thereof and at its other end with said frame, said yoke and oleo strut being at all times located within said fuselage, a pair of parallel strut means each hinged intermediate its ends for folding movement in an upward direction and each pivotally connected at its inner end with said yoke at spaced points, a ground engaging element pivotally connected with the outer end of said strut means, and means for swinging said strut means in parallelism about their pivotal connections with said yoke to carry said ground engaging element between housed and extended positions within and without said fuselage, said yoke and strut means constituting a lever of the first class when the latter is extended for yieldably supporting said aircraft.

5. In combination with the fuselage of an aircraft, a landing gear therefor comprising a yoke pivoted at its ends on the frame of the fuselage for limited swinging movement, an oleo strut pivotally connected at one end to said yoke intermediate the ends thereof and at its other end with said frame for absorbing the shock of landing, said yoke and oleo strut being at all times located within said fuselage, strut means pivotally connected at its inner end with said yoke and hinged intermediate its ends for folding movement in an upward direction, a ground engaging element pivotally connected with the outer end of said strut means, and means for swinging said strut means about its pivotal connection with said yoke to carry said ground engaging element between housed and extended positions within and without said fuselage, said yoke and strut means forming a lever of the first class when the latter is extended.

GEORGE HICKS.